Figure 1:
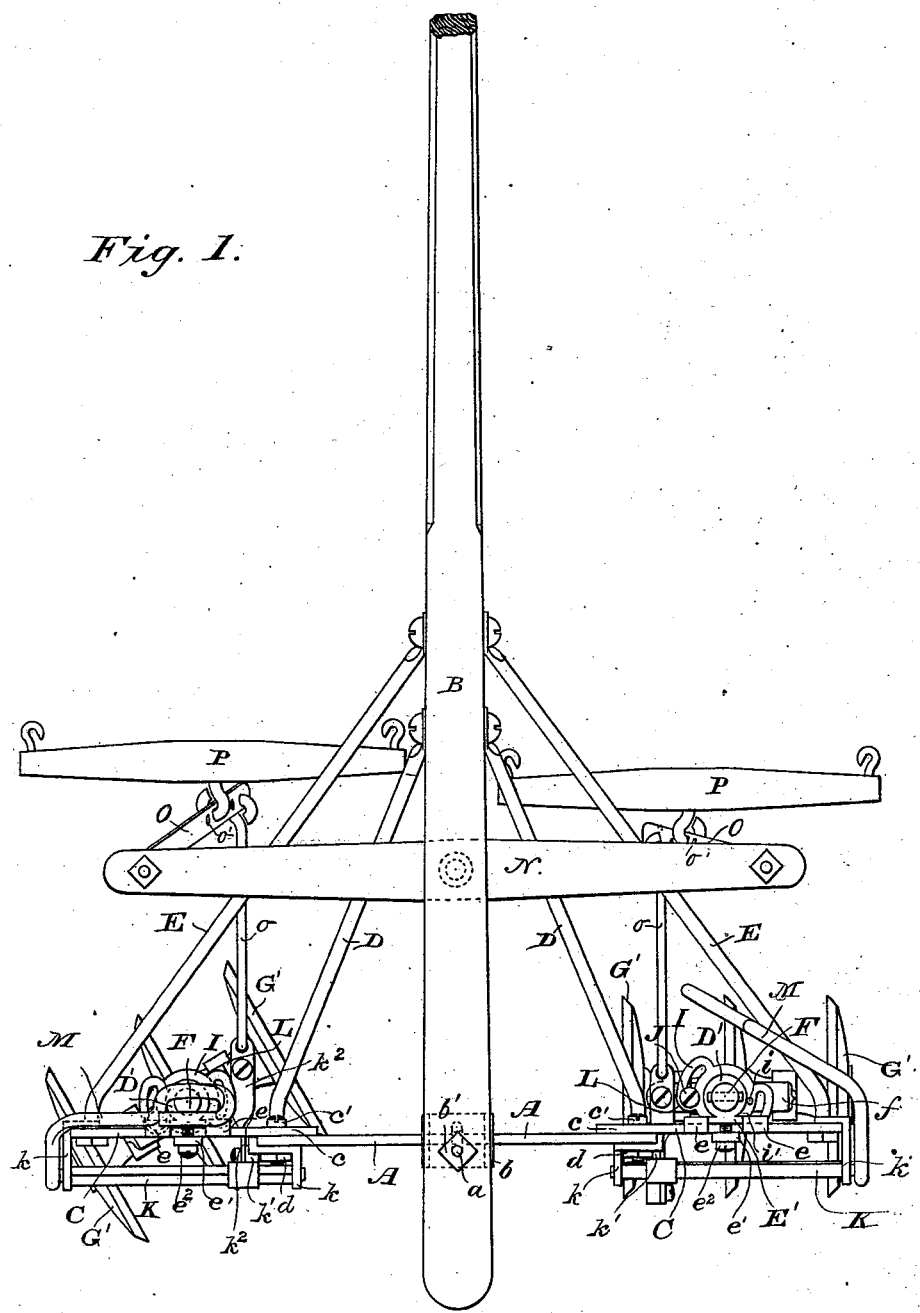

(Model.) 4 Sheets—Sheet 2.

F. BRAMER & G. G. CROWLEY.
Harrow or Cultivator.

No. 227,724. Patented May 18, 1880.

WITNESSES
Wm A. Skinkle
Wm T. Kilgrove

INVENTORS
Frank Bramer
George G. Crowley
By their Attorneys
Baldwin, Hopkins & Peyton

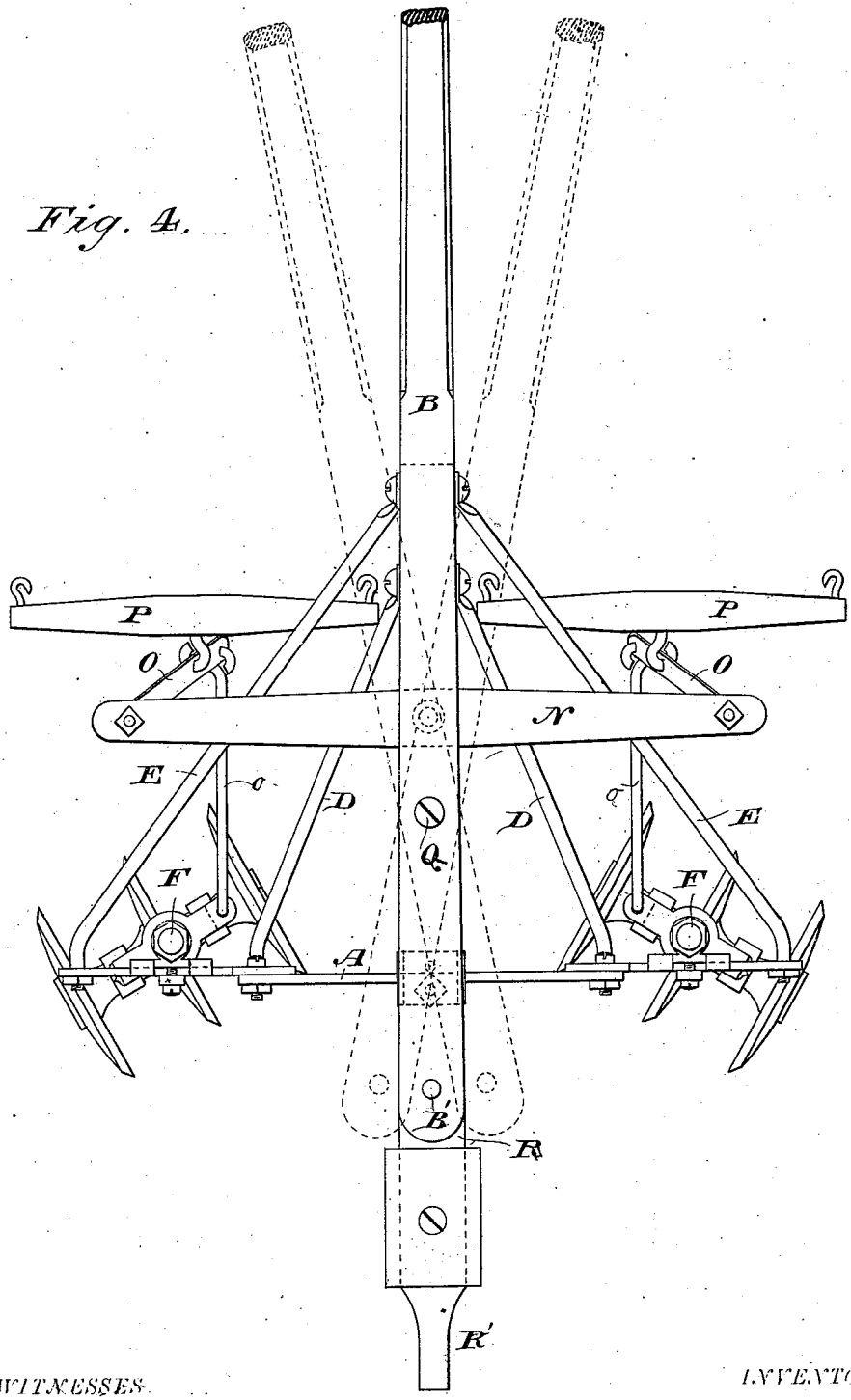

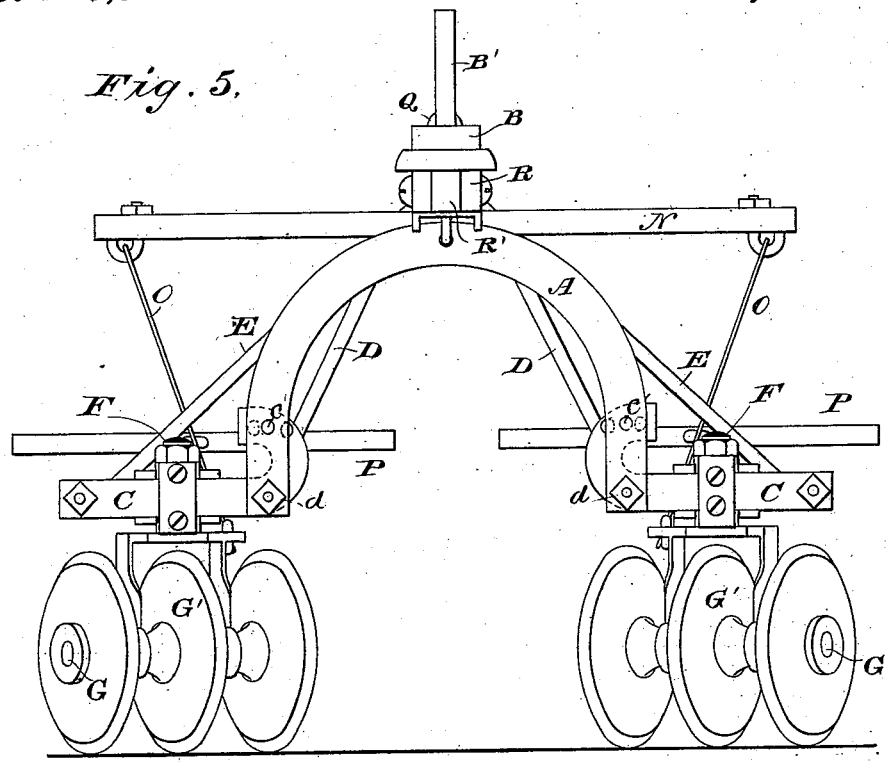

UNITED STATES PATENT OFFICE.

FRANK BRAMER AND GEORGE G. CROWLEY, OF LITTLE FALLS, NEW YORK.

HARROW OR CULTIVATOR.

SPECIFICATION forming part of Letters Patent No. 227,724, dated May 18, 1880.

Application filed April 6, 1880. (Model.)

*To all whom it may concern:*

Be it known that we, FRANK BRAMER and GEORGE G. CROWLEY, both of Little Falls, in the county of Herkimer and State of New York, have invented certain new and useful Improvements in Harrows or Cultivators, of which the following is a specification.

Our invention relates more especially to that class of machines which are supported and carried by rotating concavo-convex disk cutters arranged in two gangs; but it may also be applied to a machine having supporting-wheels and a supplementary swinging frame carrying gangs of disk cutters, such as shown in Letters Patent No. 206,218, granted to Frank Bramer, July 23, 1878.

In cultivating it is often desirable to cause the machine to zigzag or move sidewise, to follow the sinuosity of the rows of the crop and to prevent the injury or destruction of plants that are out of line with the row, and also to avoid obstructions.

Heretofore, so far as we are aware, in machines supported by cutting-disks the only way of changing the direction of the cutters has been to change the direction of the team; but it is not desirable to do this to avoid stray plants, as the damage done to the crop by the horses would be far greater than the destruction of any plants that might be out of line.

In the patent of Bramer above referred to the swinging disk-gang frame is shifted laterally by the driver pressing on it with his feet, the operation being to push the frame bodily either to one side or the other.

The object of our invention is to enable the driver readily to cause the machine, when supported by the disks, (or the swinging frame when it has carrying-wheels,) to move sidewise in either direction at pleasure without changing the direction of the line of draft.

To this end our invention, broadly stated, consists in causing the disk-gang shafts to assume different angles relatively to the line of draft. The effect of this is to cause the machine to move sidewise toward that side on which the gang-shaft is set at the greatest angle to the line of draft when the earth is being turned toward the plants by the disks, the obliquity of the movement being proportional to the difference in angle relatively to the line of draft between the two gangs.

The accompanying drawings represent a machine supported by the cutting-disks constructed in the form now best known to us. Obviously, however, numerous other ways of accomplishing the object above stated will be suggested to those skilled in the art without departing from the spirit of our invention.

Figure 2:
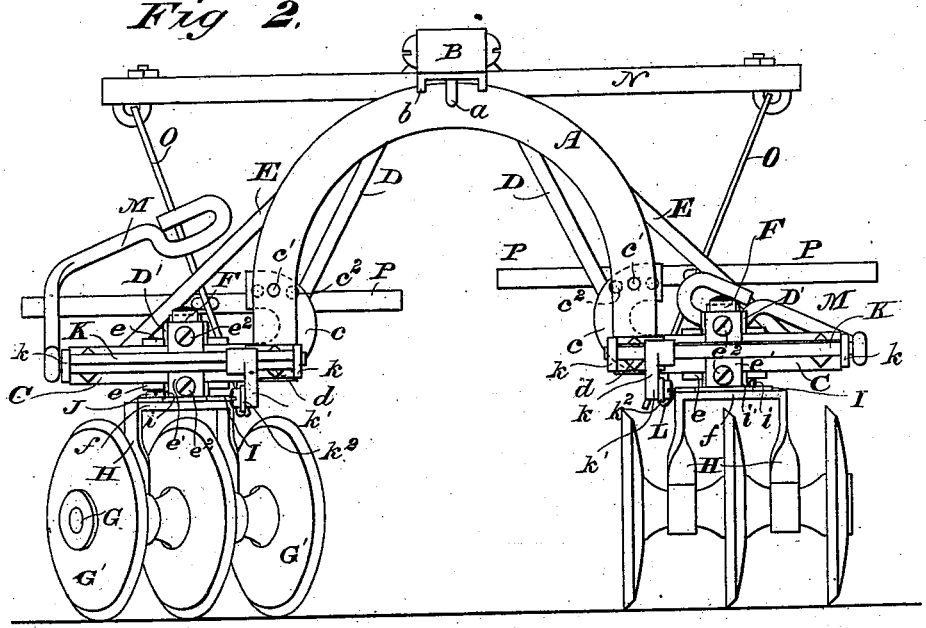
Figure 3:
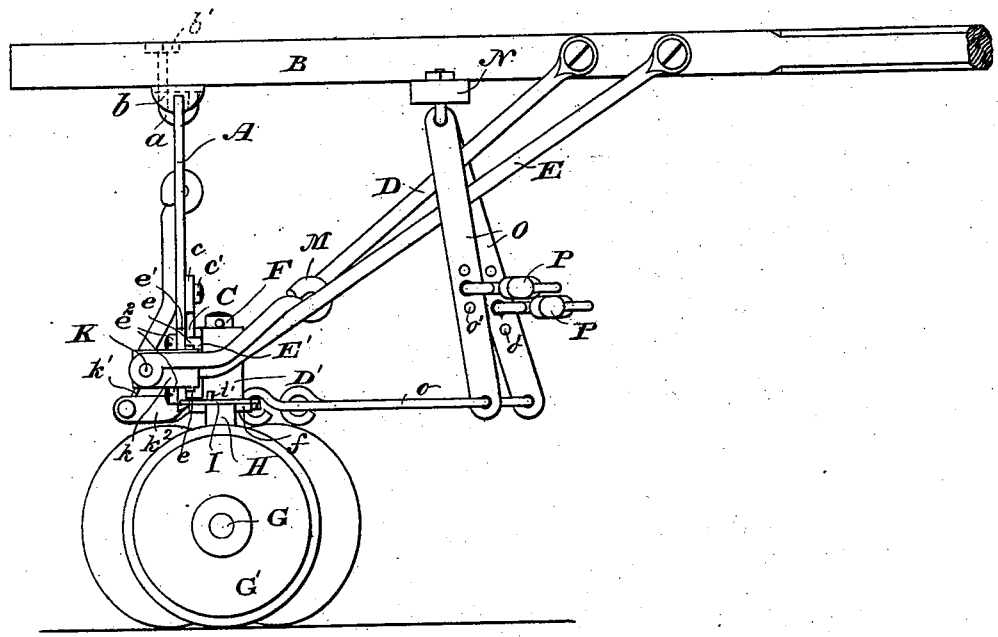

Figure 1 is a plan view; Fig. 2, a rear elevation. Fig. 3 is a side elevation. Figs. 4, 5, and 6 are views showing a modification in the construction of the machine.

A straddling arch or yoke, A, is secured to the draft bar or tongue B near its rear end by means of a hooked bolt, $a$, which passes through the draft-bar and a plate, $b$, on its under side and hooks into the yoke. The ends of the plate are turned up and notched, as shown, so as to embrace the top of the yoke. The parts are securely fastened together by means of the nut $b'$.

A horizontal arm is secured to each end of the yoke by means of a brace-rod, D, which extends from the draft-bar back through both the yoke and arm, and is tightened up by means of a nut, $d$. Another brace-rod, E, extends from the draft-bar to the outer end of the arm C. To prevent this arm from rocking vertically its inner end, $c$, is curved up and around, so as to again cross the yoke, and is secured by a bolt, $c'$.

A vertical socket, D', is carried by a plate, E', having jaws $e$, which fit over the edges of the bar C, the plate being secured thereon by means of a cross-piece, $e'$, and bolts $e^2$ $e^2$.

An upright shaft, F, has its bearings in the vertical socket D' and turns freely therein. The disk-gang shaft G, carrying disks G', is mounted in bearings in downhangers H, depending from the base $f$ of the shaft F.

A slotted plate, I, which fits over the shaft F and turns thereon, is secured in any desired position upon the upper side of the base $f$ by means of a set-screw, J, which permits its adjustment. A stop or pin, $i$, on this plate abuts against a shoulder, $i'$, on the plate E', so as to limit the movement of the shaft F in that direction, and consequently the angle of the disk-gang shaft relatively to the line of draft.

A rock-shaft, K, is mounted in lugs or ears k, projecting from the rear side of the arm C at its outer end and from the end of the yoke. This shaft is rectangular in cross-section and carries a crank-arm, $k'$, to which a pitman, $k^2$, is pivoted, the pitman being in turn pivoted to the lug L, projecting from one of the downhangers which support the gang-shaft. The shaft is rocked by means of a lever, M. The effect of depressing the lever is to draw the pitman toward the rear of the machine, and thus decrease the angle of the disk gang-shaft relatively to the line of draft. In the present instance, by putting the lever in its lowest position, the disk-gang shaft will be at about right angles to the line of draft and the disks parallel therewith; but it could be made to assume a less angle relatively thereto, so as to bring the disks parallel to the disks of the other gang.

An evener, N, is pivoted to the draft-bar C. A link, O, depending from the end of the evener, is connected to the end of the pitman $k^2$, which projects slightly beyond the lug L by means of a draft-rod, $o$.

The whiffletree P is attached to the link O, which is provided with a series of holes, $o'$, by which the height of the draft may be varied. The draft of the team causes the disk-gang to assume its proper angle relatively to the line of draft, the angle being regulated by means of the adjustable plate I.

The arm C can be adjusted by means of the bolt-apertures $c^2$ in its curved end, so as to elevate or depress the outer end of the disk-gang shaft. The outer disks of the gang can thus be made to cut deeper or shallower than the inner ones, as may be desired.

The operation of the machine when it is arranged to turn the earth toward the plants is as follows: Both disk-gang shafts being set at the same obtuse angle relatively to the line of draft, the machine will move in a straight line. When it is desired to avoid a plant or an obstruction, it is only necessary to depress one of the levers M, and the machine will move to one side without the line of draft being changed. Thus, should it be desired to have the machine move to the left, the angle of the right-hand gang-shaft relatively to the line of draft should be decreased. The obliquity of the movement is, as hereinbefore stated, proportionate to the difference in angle relatively to the line of draft between the two disk-gang shafts—that is, the more the angle of one shaft is decreased the more abrupt will be the sidewise movement of the machine, provided the disks in the gang which is being adjusted do not pass a line parallel with the disks in the other gang.

In Figs. 4, 5, and 6 we have shown a modification in the construction of our invention applicable to machines supported by the disk-gangs.

The draft-pole B is pivoted at Q to the bar R of the main frame, but is otherwise entirely unconnected with the machine. The bar R extends in rear of the machine and has a handle, R'. The draft-bar is also provided with a handle, B', at its rear end. It will be obvious that the driver, by seizing the handles R' and B', can shift or turn the main frame independently of the tongue. The effect of this is to place the disk-gang shafts at different angles to the line of draft, and therefore to cause the machine to move to one side. This operation is especially easy of execution when the disks, as shown in the drawings, are arranged to turn the earth toward the plants being cultivated, as the pivot Q, between the draft-bar and main frame, is so placed as to be the center of the circles of which the disks are approximate arcs.

In Fig. 4, for the purpose of convenience of illustration, the draft-bar is shown in dotted lines as being shifted or turned instead of the frame of the machine.

When the machine is thus constructed it would be best to have the gangs held at their proper angle to the line of draft by the strain of the team, and be free to seek a line parallel with the movement of the machine when the draft is slacked, as hereinbefore described, because the effect of swinging the frame of the machine will be to slack the draft on one of the gangs, and if it be free to turn the earth will promptly press the disks into line with the movement of the machine, and the movement to one side will be more abrupt.

We are aware that it is old, in a cultivator supported by the cutting-disks, to arrange three adjustable gangs of disks transversely to the path of the machine, one in front of the other, and to steer or control the movements of such machine by changing the angle of the leading gang relatively to the line of draft; but such a construction is different from the organization herein claimed, which contemplates the production of a machine capable of cultivating standing plants, in which the difference of pressure of the earth upon the disks of opposite gangs will cause the machine to move from side to side.

We claim as of our own invention—

1. The combination, substantially as hereinbefore set forth, of the main frame, disk-gangs mounted upon the opposite sides of said frame, and mechanism for causing each disk-gang shaft to assume a different angle from the other relatively to the line of draft, at the will of the driver, without interrupting the operation of the machine.

2. The combination, substantially as hereinbefore set forth, of the main frame, the disk-gang, its vertical shaft, the socket therefor, the crank and pitman, the rock-shaft, and a lever for operating the rock-shaft, whereby the angle of the disk-gang shaft relatively to the line of draft may be varied at pleasure.

3. The combination, substantially as hereinbefore set forth, of the disk-gang, its vertical shaft, the socket therefor, and the draft-rod, whereby the gang-shaft is promptly restored to its working angle by the draft of the team after having been turned to move the machine sidewise.

4. The combination, substantially as hereinbefore set forth, of the disk-gang, its vertical shaft, the socket therefor, the adjustable slotted plate and set-screw, the stop or pin, and the shoulder against which it abuts.

5. The combination, substantially as hereinbefore set forth, of the disk-gang, its vertical shaft, the socket therefor, the adjustable slotted plate and set-screw, the stop or pin, the shoulder against which it abuts, and the draft-rod.

6. The combination, substantially as hereinbefore set forth, of the main frame, the horizontal arm secured thereto, mechanism, substantially such as described, for elevating or depressing the outer end of said arm, and a disk-gang mounted thereon.

7. The combination, substantially as hereinbefore set forth, of the main frame, the disk-gangs, their vertical shafts, the sockets therefor, levers for changing the angle of each gang, and draft-rods connected to the disk-gangs.

8. The combination, substantially as hereinbefore set forth, of the draft-bar, the straddling arch or yoke, the horizontal arms secured to the ends of said yoke, the side braces, disk-gangs mounted on the horizontal arms, and levers for controlling the angle of the gangs relatively to the line of draft.

In testimony whereof we have hereunto subscribed our names.

FRANK BRAMER.
GEO. G. CROWLEY.

Witnesses:
GERRET DRAKE,
A. D. WILSON.